United States Patent [19]

Driver et al.

[11] 4,306,489

[45] Dec. 22, 1981

[54] COMPOSITE PISTON

[75] Inventors: Howard D. Driver; Frank H. Doyal, II, both of Raleigh, N.C.

[73] Assignee: Exxon Research & Engineering Co., Florham Park, N.J.

[21] Appl. No.: 90,447

[22] Filed: Nov. 1, 1979

[51] Int. Cl.[3] .......... F16J 1/00

[52] U.S. Cl. .......... 92/212; 92/224; 123/193 P

[58] Field of Search .......... 92/224, 212, 248; 123/193 P

[56] References Cited

U.S. PATENT DOCUMENTS

| | | | |
|---|---|---|---|
| 1,294,956 | 2/1919 | Schou | 92/212 |
| 1,398,178 | 11/1921 | Lukacsevics et al. | 92/212 X |
| 1,407,667 | 2/1922 | Lukacsevics et al. | 92/224 X |
| 2,746,818 | 5/1956 | Woituk . | |
| 2,777,427 | 1/1957 | Nichols | 92/248 X |
| 2,806,751 | 9/1957 | Sykes . | |
| 3,075,817 | 1/1963 | Mayes | 123/193 P |
| 3,115,070 | 12/1963 | Tsang | 92/212 |
| 3,890,950 | 6/1975 | Haldeman | 123/193 P |
| 3,906,923 | 9/1975 | Harker | 92/212 X |
| 4,170,926 | 10/1979 | Emmett | 92/248 |

FOREIGN PATENT DOCUMENTS

| | | | |
|---|---|---|---|
| 326274 | 3/1930 | United Kingdom | 92/224 |
| 1413114 | 11/1975 | United Kingdom | 92/248 |

*Primary Examiner*—Irwin C. Cohen
*Attorney, Agent, or Firm*—Joseph J. Dvorak

[57] ABSTRACT

A composite piston for internal combustion engines is provided. The base structure of the piston is formed from a fiber-reinforced resin material. Covering the head portion of the base structure and integral therewith is a cap portion formed of a nonflammable material such as metal, metal alloys and ceramics. The cap and head portion of the piston have an outer diameter which is less than the outer diameter of the piston body by an amount sufficient to accommodate for the difference in the thermal coefficient of expansion of the material of the cap and the material of the base structure.

3 Claims, 5 Drawing Figures

COMPOSITE PISTON

FIELD OF THE INVENTION

This invention relates to pistons for internal combustion engines and more particularly to light-weight pistons of hybrid composite construction.

BACKGROUND OF THE INVENTION

Light-weight, high-strength composite structures are being employed in an ever-wider variety of applications, particularly where the benefits to be gained by use of such materials clearly offset the generally higher costs associated with them. One area of increasing use of composite materials is in the automotive components area where the light weight and high strength aspects of the composite materials can be translated into higher fuel efficiencies. Examples of such light-weight, high-strength components include leaf springs, stabilizer bars, body parts and the like.

Another potential automotive application for light-weight, high-strength composite structures is in reciprocating components such as pistons. Not only will light-weight pistons result in a reduction in dead weight, as in stationary components, but there is also a decrease in the mechanical loss that results by a reciprocating mass. For example, approximately 50% of the forces encountered by a reciprocating engine component is a result of the component's own weight. Therefore, a reduction in weight leads to a reduction in load and thus allows a further reduction in weight and increased efficiency.

New light-weight, high-strength pistons have potential utility also where engine performance is of paramount concern such as with racing vehicles. Lighter weight pistons can result in greater output for a given engine design. Even small engines used, for example, in chain saws and the like would be vastly improved by use of light-weight, high-strength components. The physical debilitating vibrations endured by the operator of such mechanisms can be significantly reduced by use of lighter weight pistons for such engines.

Despite this myriad of potential uses for such light-weight composite reciprocating components, there has been little progress in the area of developing a suitable light-weight piston due to the high temperatures and high repetitive loadings that such parts are subjected to. Thus, light-weight pistons have been made in the past from metals such as aluminum reinforced by steel. A drawback in such constructions, of course, is that at the temperatures prevailing in use the significant differences in the thermal expansion of the different materials, the aluminum and steel, result in additional problems which must be overcome to satisfactorily employ such hybrid structures.

PRIOR ART

U.S. Pat. No. 2,746,818 discloses a composite piston which has a cylindrical body of two-piece construction of non-metallic material, a metallic center portion, a metallic head and a metallic base, being joined and interconnected by means of studs.

U.S. Pat. No. 2,806,751 discloses a piston which has an aluminum body and a wearing skirt of graphite.

U.S. Pat. No. 3,075,817 discloses a piston which consists substantially of an aluminum body reinforced with steel.

U.S. Pat. No. 3,115,070 discloses a composite piston which has a polytetrafluoroethylene insert in the skirt of the piston so as to cushion the thrust of the piston against the cylinder walls.

U.S. Pat. No. 3,890,950 discloses a piston which has reinforcing fibers of lamellar structure adhered to a grooved surface in the piston.

From the foregoing, it should be readilly apparent that there still remains a need for an improved piston which will be significantly lighter in weight, have improved friction and wear properties, and have adequate strength and thermal resistance to the load and temperature conditions existing in use.

SUMMARY OF THE INVENTION

Briefly stated, the present invention contemplates a piston of unitary construction having a base structure of fiber-reinforced resin material, the base structure being cylindrical in shape and having a head portion, body portion and skirt portion. Completely covering the head portion of said base structure and integral therewith is a cap portion made of a non-flammable material such as ceramics or metals, and metal alloys, and particularly of a thermally conductive material such as aluminum metal.

DETAILED DESCRIPTION OF THE INVENTION

Figure 1:
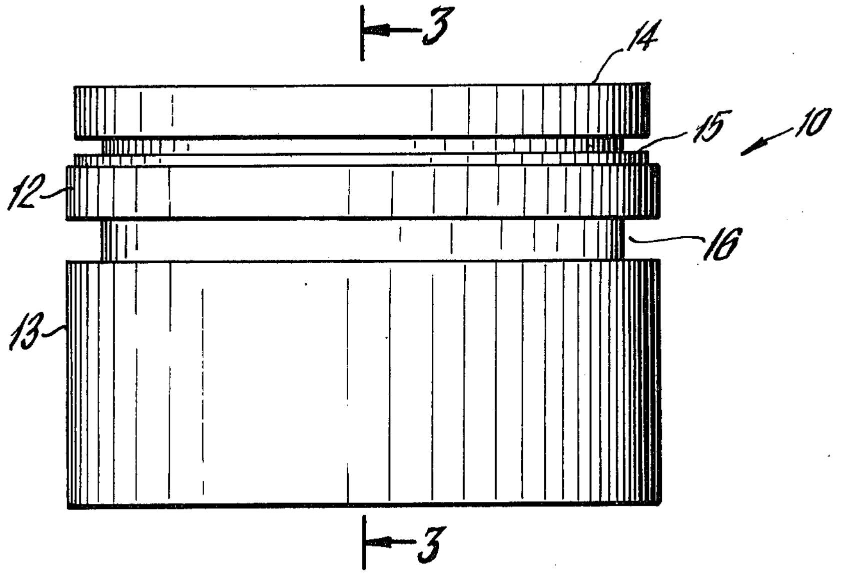
FIG. 1 is a front elevation of a piston in accordance with the present invention.

Referring now to the drawings, it should be noted that like reference characters designate corresponding parts throughout the several drawings and views.

The piston 10 of the present invention is formed from a fiber-reinforced base structure having a head portion 11, a body portion 12 and a skirt portion 13. Bonded to and integral with said head portion 11 is a cap 14.

The base structure of the piston 10 of the present invention is formed from a fiber-reinforced resin material. In the practice of the present invention, the fibers are discontinuous, randomly oriented fibers, i.e. the fibers having lengths ranging generally from about $\frac{1}{8}$" to 2" and particularly about $\frac{1}{2}$" in length. The reinforcing fibers are selected from typical reinforcing materials such as boron, carbon, graphite, glass, polyaramids and mixtures thereof. Preferably, however, the fibers are selected from glass and carbon and graphite fibers. As will be readily appreciated, the glass fibers are relatively less expensive than carbon fibers and, consequently, will be the fiber of choice where expense is the sole criteria in fabricating a piston of this invention. On the other hand, the carbon fibers are much lighter than glass fibers, and where weight is of prime concern, graphite fibers or carbon and graphite fibers will be the fiber of choice. A compromise, of course, will be a selection of a mixture of glass and carbon and graphite fibers.

As indicated herein, the continuous fibers are embedded in a resin matrix. In general, any resin may be employed such as thermoplastic or thermoset resins, although it is preferred that the resin matrix be a thermosetting resin.

Suitable thermosetting resins include epoxy, polyimide, and polyester resins.

The epoxy resins are polyepoxides, which are well known condensation products, or compounds containing oxirane rings with compounds containing hydroxyl groups or active hydrogen atoms such as amines, acids and aldehydes. The most common epoxy resin compounds are those of epichlorohydrin and bisphenol and its homologs. The polyester resin are polycondensation products of polybasic acids with polyhydric alcohols. Typical polyesters include polyterephthalates such as polyethylene terephthalate. The polyimide resins are derived from pyromalletic dianhydride and aromatic diamines.

The amount of fiber in the resin will vary depending upon the choice of fiber or fibers, the strength and weight characteristics of the ultimate part, and the like. In general, for an internal combustion engine piston, from about 40 vol. % to about 70 vol. %, and preferably from about 55 vol. % to about 65 vol. % of glass fiber in the resin will be employed. Particularly preferred is from about 60 vol. % to about 65 vol. % of glass fibers in an epoxy resin matrix. Also, when the reinforcing fiber is carbon fiber, then generally from about 40 vol. % to about 70 vol. % and preferably from 55 vol. % to about 65 vol. % of carbon fiber in the resin will be employed. Particularly preferred is from 60 to 65 vol. % of chopped carbon or graphite fibers in an epoxy resin matrix.

The piston of the present invention is most advantageously fabricated by compression molding techniques. Indeed, commercially available resin-fiber reinforced thermosetting compositions in sheet or bulk form which are designated for compression molding are eminently suitable for the practice of the present invention. Typical commercially available molding compounds, such as fiberglass filled epoxy resin molding compounds and graphite fiber filled epoxy molding compounds are sold in bulk form under the trade designation EM-7302 and EM-7125, respectively, by the U.S. Polymeric Division of HITCO, Gardenia, CA and in sheet form under the trade designation Lytex 5G65 by Morton Chemical Co., Woodstock, IL.

The material used in making the cap member 14 may be selected from a wide range of materials which are relatively non-corrosive and stable under the high temperatures and pressures to which the pistons are normally subjected under conditions of use in internal combustion engines. Among the types of materials that are suitable in fabricating cap member 14 are metals and ceramics. In the practice of the present invention, it is particularly preferred that cap member 14 be formed from metals and metal alloys such as steel, aluminum and titanium. Indeed, it is particularly preferred that cap member 14 be formed from the following aluminum alloys: 2024, 7075, 7078, and 6061. The foregoing numerical designations refer, of course, to the U.S. alloy compositions. It is particularly preferred that these alloys have a T-3 temper. Aluminum alloys having the foregoing compositions and temper are articles of trade and readily available and can be shaped into the requisite cap member 14 by standard techniques such as drawing or extruding appropriate billets to the required dimensions.

In fabricating the piston of the present invention, provision must be made for the difference in thermal coefficient of expansion between the base structure of the piston and the cap member 14. As can be seen in the Figures, when using an aluminum cap member 14, which has a thermal coefficient of expansion greater than the material of the base structure, the outer diameter of cap 14 is therefore designed to be less than the outer diameter of the skirt portion and the body portion of piston 10 in amounts sufficient so that, in use, the cap portion 14, upon expansion, will have an outer diameter no greater than the outer diameter of the shirt and ring portion of the base structure of piston 10. It is necessary, therefore, that the head portion of the base structure of piston 10 also have an outer diameter less than the outer diameter of the body or skirt portions of the base structure.

As can be seen, the cap member 14 is provided with an annular groove 15 for a compression ring. Similarly, the body portion 12 of the base structure of piston 10 is optionally but preferably provided with an annular groove 16 to accommodate an oil ring when required. For example, an oil ring will be required if the piston is used in a 4 cycle motor but will not be required if the piston is used in a 2 cycle motor. Also, a plurality of such annular grooves can be provided for a plurality of sealing rings if so desired.

Figure 2:
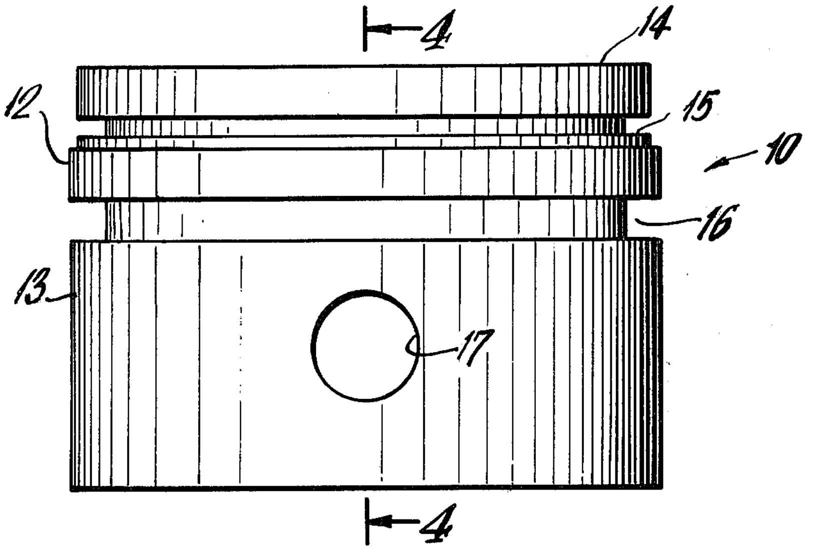
FIG. 2 is a side elevation of a piston in accordance with the present invention.

As can be seen in FIG. 2, opening 17 can be provided, for example, by drilling a hole in the side of skirt 13, thereby providing an appropriate opening for a piston pin. Also, as can be seen in FIG. 2, the wall thickness of skirt 13 in the area of opening 17 can be increased to serve as a piston boss and to provide added strength. If so desired, the opening 17 can be adapted to receive a bushing for additional wear resistance.

It is particularly important in the practice of the present invention that cap member 14 be provided with means for positively and nondetachably engaging the head portion 11 of the base structure of piston 10. This is achieved most readily by providing a circumferential groove 19 within the inner diameter of cap member 14 to accommodate engaging relationship and outwardly extending circumferential flange 20 of head portion 11.

Figure 5:
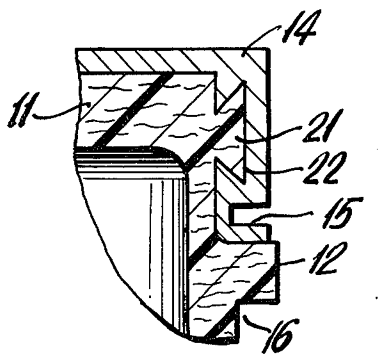
FIG. 5 is a fragmentary cross-sectional view showing an alternate embodiment of the present invention.
Figure 3:
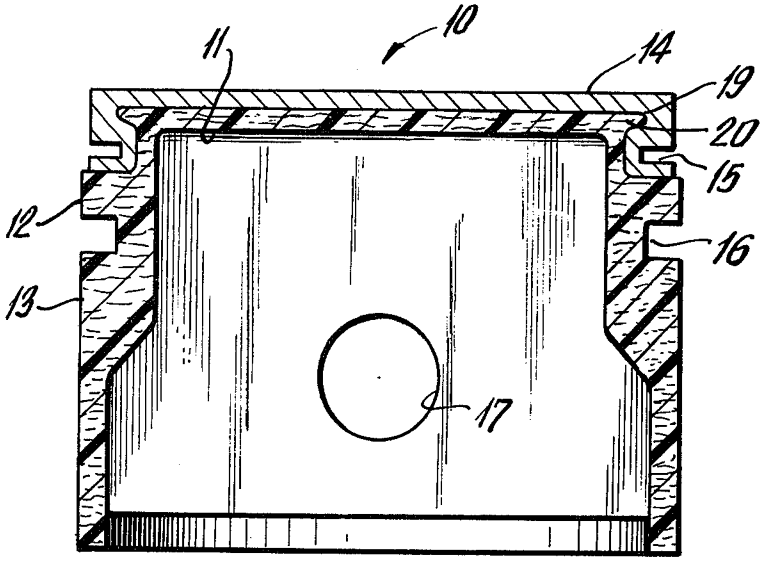
FIG. 3 is a cross-sectional view taken along lines 3—3 of FIG. 1.
Figure 4:
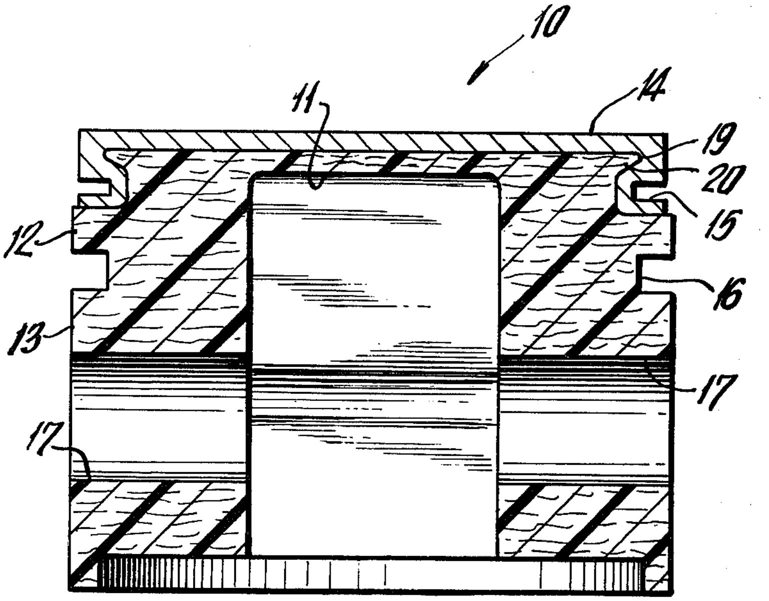
FIG. 4 is a cross-sectional view taken along lines 4—4 of FIG. 2.

In an alternate embodiment of the present invention shown in FIG. 5, the cap member 14 is permanently secured to the head portion 11 in part by means of a key 21 extending into a complimentary keyway 22.

The piston is fabricated by placing the cap member 14 in the appropriate mold; for example, using an aluminum cap member 14, the aluminum is first sand blasted and then washed with trichloroethylene and placed in the mold for integral molding. Thereafter the mold is charged with the requisite resin such as one of the sheet molding compounds referred to hereinabove. The mold is closed, and the assembly is subjected to appropriate heat and pressure. For example, the resin may be cured at temperatures ranging generally from about 275° F. to about 325° F. and at pressures of from about 1000 psi to about 5000 psi. After cooling, the part is removed from the mold.

To further illustrate the present invention, reference is made herein to the following example.

EXAMPLE

Following the procedure outlined above, a piston for a 5-horsepower Briggs-Stratton racing engine was fabricated. The body portion of the piston including the piston boss was formed from a glas fiber reinforced epoxy resin bulk molding compound containing about 60% glass fibers. The cap member 14 was made from 6061 aluminum alloy having a T-3 temper. The dimensions of the piston were substantially identical to the dimensions of the piston in the Briggs engine performance version, with the exception, however, that the outer diameter of the cap was approximately 0.030 inches smaller than the diameter of the piston skirt portion, in order to accommodate for the expansion of aluminum during use. The thickness of cap 14 was 0.060 inches. The piston was formed by compression molding the fiber reinforced resin material in an appropriate mold containing the aluminum cap so that the aluminum cap became bonded to and interlocked with the head portion of the base structure. The molding was actually conducted at 300° F. and at a pressure of 3000 psig. After fabricating the piston, it was weighed and found to be 25% lighter than the normal metal piston used in such an engine.

The piston so fabricated was field tested in a racing vehicle for over 250,000 load cycles (revolutions of the crankshaft) without failure.

What is claimed is:

1. An internal combustion engine piston comprising:

a base structure having a head portion, a body portion and a skirt portion, said base structure being formed of a glass fiber-reinforced epoxy resin material containing about 60% glass fibers and including an annular ring groove adapted to receive an oil ring and a pair of opposed openings adapted to receive a piston pin;

a cap portion integral with said body structure and covering said head portion, said cap portion being formed from an aluminum alloy and having an annual groove adapted to receive a compression ring;

said head portion and said cap having interlocking means for nondetachably engaging each other;

said head portion and said cap portion having an outer diameter less than the outer diameter of said skirt and body portion in an amount sufficient so that in use said cap and body portion will, upon expansion, have an outer diameter no greater than the outer diameter of said body portion and said skirt portion.

2. The piston of claim 1 wherein said interlocking means includes an annular flange on said head portion and an annular groove on said cap.

3. The piston of claim 1 wherein said interlocking means includes a key and keyway.

* * * * *